United States Patent Office 3,091,496
Patented May 28, 1963

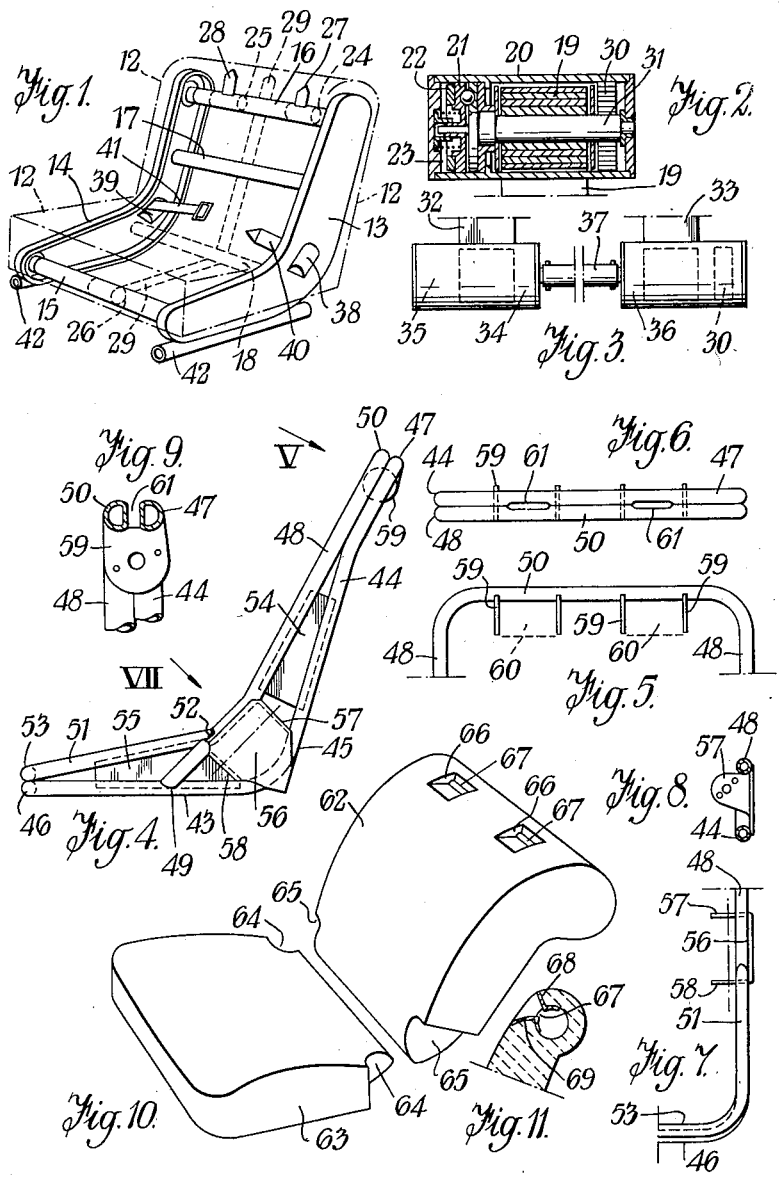

3,091,496
VEHICLE SEATS WITH SAFETY HARNESS
James Sydney Bentley, London, England, assignor to Teleflex Products Limited, London, England, a British company
Filed Sept. 12, 1960, Ser. No. 55,204
Claims priority, application Great Britain Sept. 9, 1960
1 Claim. (Cl. 297—386)

This invention relates to seats with back-rests for vehicles, particularly but not exclusively for motor road vehicles, air and marine craft, and has for its main object so to fabricate such seats that their structure includes built-in reels constituting anchorages, for inertia safety harness, in place of as at present attaching said reels to an existing seat structure or the floor or other part of the vehicle.

It has for a further object so to form the internal frame structure of the seat that it is adapted to withstand the very great stresses and strains set up when the safety harness automatically restrains the traveller, especially the shoulders and head of the traveller, from sudden forward movement in relation to the seat when the inertia "lock" is operated by any sudden deceleration of the vehicle.

The invention has for another object to form the internal frame structure with two stiff shaped and spaced-apart side portions which are connected by stiff transverse members, one or more of the transverse members having integrated therewith at least one reel including an inertia locking means and forming the anchorage for inertia safety harness to engage over the shoulders of the traveller, and each of the stiff side portions having built-in anchorages for the ends of the two parts of a lap belt to be fastened at the front of the traveller, either or both of which anchorages may be constituted by such inertia locking safety reels.

According to the present invention, a vehicle seat comprises two stiff side portions of approximate L shape, made integral with or securely joined together by stiff transverse members, the ends of which at or towards the front connect the more or less horizontal parts of the L and at or towards the rear the top of the upright portions; others, if required, are located in one or more intermediate positions.

Each side portion may be of any suitable construction, for example it can be a somewhat flattened casting, a deep flanged pressing, or of box section, or fabricated from straight or curved tubing of circular, square or other section, suitably strutted and/or tied, and having integral transverse members.

Each stiff transverse member may be a casting, or of angle, channel or other flanged or ribbed section, or formed from a tube of circular, square or other section; when tubular, it can be a continuation of a tube of the side portions.

At least one of the stiff transverse members must be constructed to have secured thereto or therein, one inertia safety harness reel, or in some cases two such reels suitably spaced apart.

Whatever the exact construction of the side portions, each includes or has secured thereto an anchorage for the end of a strap of a lap belt of suitable construction. When such an anchorage is an inertia locking reel, then the side portion has means for the secure attachment or housing of such reel, with its axis located to suit the run of the strap of the lap belt; moreover, the construction can include only one inertia reel on one side portion, or such a reel on each side portion.

In order that the invention may be better understood, it will now be described with reference to the accompanying somewhat diagrammatic drawings, which are given by way of example only and in which:

FIG. 1 is a diagrammatic perspective view of the frame structure of a vehicle seat with a back rest, made according to an embodiment of the invention.

FIG. 2 is a sectional elevation to an enlarged scale of one form of an inertia locking reel for use with seats made according to the invention.

FIG. 3 shows to a smaller scale than FIG. 2, another arrangement for an inertia reel lock, for use with seats made according to the invention.

FIG. 4 shows to a smaller scale, a side elevation of another frame structure of a vehicle seat with a back rest, made according to another embodiment of the invention.

FIG. 5 shows a fragmentary plan taken in the direction of the arrow V, FIG. 4.

FIG. 6 is a plan of FIG. 5.

FIG. 7 is a fragmentary plan view taken in the direction of the arrow VII, FIG. 4.

FIG. 8 is a plan of FIG. 7.

FIG. 9 is an enlarged sectional elevation of a portion of the upper transverse member of the seat frame shown in FIG. 4.

FIG. 10 is a perspective view of the upholstery (detached) for a seat frame (such as shown in FIG. 4) made in accordance with the invention, and FIG. 11 is a fragmentary sectional side elevation of a portion of FIG. 10.

In the form shown in FIG. 1, the vehicle seat comprises an inner stiff internal frame structure enclosed within a suitable upholstery 12, indicated by dot and dash lines. The internal frame has two spaced-apart stiff side portions 13 and 14 of channel section and general L shape, with the channels facing. At the front of the seat these are connected by a stiff tubular transverse member 15 fixedly secured to the portions 13 and 14. Similarly, at the top of the back the portions 13 and 14 are connected by a transverse member 16 firmly secured thereto. There is a further spacing transverse member 17 between the upwardly directed parts of the L side portions, and in some constructions another transverse member such as shown dotted at 18, could be provided at the rear of the seat portion.

Any suitable form of inertia locking reel could be used in conjunction with the seat structure; for instance, that shown in Fig. 1 of the specification of applicant's co-pending United States patent application Serial No. 8,427 filed February 12, 1960, and FIG. 2 of the drawings of the present application is a similar view to the said FIG. 1.

Briefly described, when the strap 19 is pulled out from the casing 20 relatively slowly, which happens by the normal movements of the traveller, an inertia mass 21 participates in such slow movement, but when there is a sudden pull on the strap 19 (by the sudden deceleration of the vehicle which tends relatively to throw the traveller wearing the harness forwards) then the inertia mass 21 tends to lag behind and not to participate in the sudden pull, such lagging action operating a locking means, in the present instance causing a brake pad 22 to be moved laterally into forced contact with a surface 23 to brake the action and stop any further movement of the strap.

In the present arrangement, the transverse member 16 is a tube of sufficient diameter to receive and have fixed therein the outer casings 24 and 25 of two inertia locking reels, such as shown in FIG. 2, the said transverse member also having slots in suitable positions for the emergence of the straps 27 and 28 of such reels.

The straps 27 and 28 emerge upwardly so that they can be pulled outwardly and pass over the shoulders of the seated traveller. The lower ends are then connected to a lap strap, to be hereafter described.

In place of two casings carried by the upper transverse member 16, it may only carry one such casing. In this instance the end of its strap will be connected to the junction between two shoulder straps, one to pass over each shoulder of a seated traveller.

It is not necessary that the inertia locking reel or reels should be fitted to the uppermost transverse member such as 16. The front and lowest transverse member 15 could carry said reel or reels. 26 (FIG. 1) indicates such an inertia reel fixed in the transverse member 15.

In this case, its strap 29, shown dotted, must pass to the rear, around a stiff transverse member such as 18, and then upwardly behind the transverse member 16, to emerge through the upholstery as hereafter explained, and there be joined to two connected shoulder straps. Similarly, an inertia reel or reels could be secured to either of the intermediate transverse members 17 or 18. Normally, only one, or at the most two spaced-apart inertia reels will be necessary for each seat.

The inertia reel shown in FIG. 2 includes in a known manner an automatic take-up coil spring 30, one end of which is attached to the casing 20 and the other end to the spindle 31 to which the end of the strap 19 is fixed. This spring automatically winds the strap on to the spindle when there is any slack in such strap, and the arrangement further is such that when the strap is free this spring winds it entirely on to the spindle so that only the end emerges through the upholstery.

The construction shown in FIG. 3 will allow for one inertia reel proper to control two spaced-apart shoulder straps 32 and 33. In this case one casing 34 has the inertia locking mechanism located in the space 35 as well as the spindle on which the strap 32 is wound. The other similar casing 36 has its spindle fixedly connected to the spindle of the first casing by a hollow shaft 37, but this second casing 36 does not have an inertia locking mechanism, but in addition to a space for its strap 33, has a space to accommodate an automatic return spring 30 which functions for the re-winding of both straps 32 and 33. However, it will be appreciated that the one inertia locking mechanism serves to hold both straps from movement when it is operated, as their spindles turn as one.

A construction such as shown in FIG. 3 could be fixed in any one of the transverse members 15, 16, 17 or 18.

Although it is preferred to form each inertia locking reel with its own casing, in some instances the transverse member carrying the inertia lock, may itself be used as the casing.

The side portions 13 and 14 have anchorages for the ends of a lap strap of any suitable known construction. This strap may be made up from two strap portions each anchored to a side portion and with engageable fastenings at the ends, adapted to be fastened together to firmly engage with the lap of the traveller. When the anchorage is an inertia locking reel, then the side portion, such as 13 or 14, has means for the secure attachment or housing of such reel, with the axis at an angle to suit the run of the strap. FIG. 1 shows, on the exterior of the side portion 13, a more or less semi-cylindrical pressed-up or attached portion 38 of a housing in which an inertia reel can be fixed. The other side portion 14 shows similarly a more or less semi-cylindrical attached portion 39 of a housing for an inertia reel. Such a reel can be secured in a housing on one side portion 13 or 14 or on both side portions.

The two parts 40 and 41 of a lap strap, adapted to be fastened together, are shown in FIG. 1, and each can have an inertia locking reel. As before stated, the ends of the shoulder straps, such as 27 and 28, can be secured to the lap strap. Preferably, this can be to the connecting fitting between the two strap portions 40 and 41 when they are engaged together.

As a consequence, a traveller occupying a vehicle seat fitted with the safety harness as particularly described, can be seated with the harness fastened in position, and retain adequate freedom of movement which will only cause the straps, or one of such straps, to move slowly on to and off the associated inertia reels.

When, however, there is a sudden pull on the shoulder straps, the inertia locks associated therewith hold the traveller from being relatively thrown forwards, both the shoulder straps and the lap strap exercising a restraining hold, to retain the traveller "as one" with the seat.

Any suitable known means may be provided for securing the seat structure to the chassis or other suitable part of the vehicle. FIG. 1 shows bearers 42 for this purpose, which are welded or otherwise firmly secured to the lower parts of the side portions 13 and 14.

The internal frame structure for a vehicle seat with a back rest, in accordance with the present invention, shown in FIGS. 4 to 9, is made up from bent steel tubes welded together. The main frame as seen in side elevation, FIG. 4, is of somewhat L shape with a horizontal part 43 and an uprising part 44 joined by a bend 45. The ends of these parts 43 and 44 are turned round at right angles into horizontally extending transverse members 46 and 47 respectively, which in turn are bent to continue into other parts at the other side of the seat, to form horizontal and uprising parts similar to 43 and 44.

In addition there is a bent frame of inverted U formation having limbs 48, one of which is seen in FIG. 4. The lower ends of the limbs 48 are welded at 49 to the horizontal portions 43, and the transverse member 50 uniting the limbs 48 comes coincident with the transverse member 47 to which it is welded along parts of its length. There is another U frame having two similar limbs, one of which, 51, is seen in FIG. 4. The ends of these limbs are welded at 52 to the limbs 48 towards their lower ends, and the limbs 51 are connected by a transverse member 53 which lies on and is coincident with the front lowermost transverse member 46, to which it is welded.

Further, each side portion includes a stiffening plate 54 welded to the parts 44 and limbs 48, and in addition each side portion includes another stiffening plate 55 welded to the parts 43 and the limbs 51. In the result, the seat frame has two very strong and stiff side portions united by integral transverse members, one coming at the top of the back rest and the other at the front of the seat.

To accommodate inertia reels for two lap strap portions, each side portion includes a further strengthening plate 56 located at the bend at the rear of the seat, and welded to said bends and to the lower parts of the limbs 48. Projecting inwardly, each of these plates 56 has apertured lugs 57 and 58 to which the end plates of the inertia reels are affixed in such manner that the slots for the emergence of the straps come in a convenient position to pass over the lap of a seated traveller.

In this instance, the seat structure is designed to carry two inertia reels from the upper transverse members 47—50, and for this purpose in spaced positions these transverse members 47—50 have welded thereto downwardly projecting apertured plates 59 between pairs of which are fixed the casings for the inertia reels which are indicated by dotted lines at 60, FIG. 5.

To allow for the emergence of the straps in the required position, the transverse members 47 and 50, in the positions between the pairs of plates 59, are flattened so that, when the transverse members are welded together, slots 61 are left for the emergence of the straps. This is clearly seen in FIG. 9.

Whatever the exact form of the stiff internal frame for the seat, when the construction is completed it is upholstered by suitable padding, stuffing, springs or otherwise in any usual manner, to form the seat proper, the back-rest and possibly a neck-rest. This upholstery must be supported in the interior so that there is no interference with the operation of the interior straps or reels.

Further, this upholstery must be slotted in the requisite positions for the emergence of the portions of the shoulder or other straps.

One somewhat diagrammatic construction is shown in FIGS. 10 and 11, where the upholstery is shown separate from the internal framework and comprises a back and neck portion 62 and a seat portion 63. It will be understood that this latter completely envelops the framework and has corner shapings 64 to allow for the passage upwardly of the portions of the lap strap. The other part 62 also is shaped at 65 for a similar purpose.

Just above the transverse members, for example the combined members 47 and 50 of FIG. 4, the upholstery has flared openings 66 proceeding from slots 67 through which the ends of the straps pass. FIG. 11 shows how the slots and openings 66 are held shaped by stiff liners 68 and 69.

When the safety harness is not in use, the arrangement is preferably such that the exterior straps are all pulled in (by the springs 30 of the reel or reels) so that only stiffened tongue portions at the ends of the straps are left projecting from the guide slots or otherwise of the upholstery.

The invention is not limited to the precise forms or details of construction herein described, as these may be varied to suit particular requirements.

What I claim is:

In combination with a vehicle having a chassis, a safety seat adapted to be installed in said vehicle and connected to said chassis, comprising a frame structure including a pair of reinforced L-shaped side frame members, a plurality of rigid tubular transverse frame members with their ends secured to said L-shaped frame members to hold the same in spaced apart relation with one of said transverse frame members connecting the upper portions of the L-shaped frame members and another transverse frame member secured to the front portions of said L-shaped frame members, at least one of said tubular frame members being provided with a slot, longitudinally extending connecting members secured to the lower portions of said L-shaped frame members adapted to space said frame structure from the floor of said vehicle and to couple the same to said chassis, upholstery secured on said frame structure completely enclosing the same to form front and back cushion surfaces defining a seat, and a safety harness device secured to said frame structure and concealed within said upholstery, said device including a tubular housing mounted within one of said tubular frame members and having a slot adapted to register with the slot in said frame member, a spring re-wind shaft rotatably mounted in said housing, a harness reel secured to said shaft, a harness strap wound on said reel and affixed thereto with its free end extending through the slots in said housing and tubular member and through a corresponding slot in said upholstery, and inertia locking means within said housing for locking said reel when said strap is subjected to sudden impact movement.

References Cited in the file of this patent

UNITED STATES PATENTS

| | | |
|---|---|---|
| 2,071,903 | Shively | Feb. 23, 1937 |
| 2,195,334 | Lethern | Mar. 26, 1940 |
| 2,263,348 | Barros | Nov. 18, 1941 |
| 2,292,386 | Manson | Aug. 11, 1942 |
| 2,825,581 | Knight | Mar. 4, 1958 |
| 2,830,655 | Lalande | Apr. 15, 1958 |
| 2,899,146 | Barecki | Aug. 11, 1959 |